Sept. 28, 1971        H. G. MEUNIER        3,608,357
MEASURING THE PERMEABILITY OF GRANULAR MATERIAL
Filed March 23, 1970
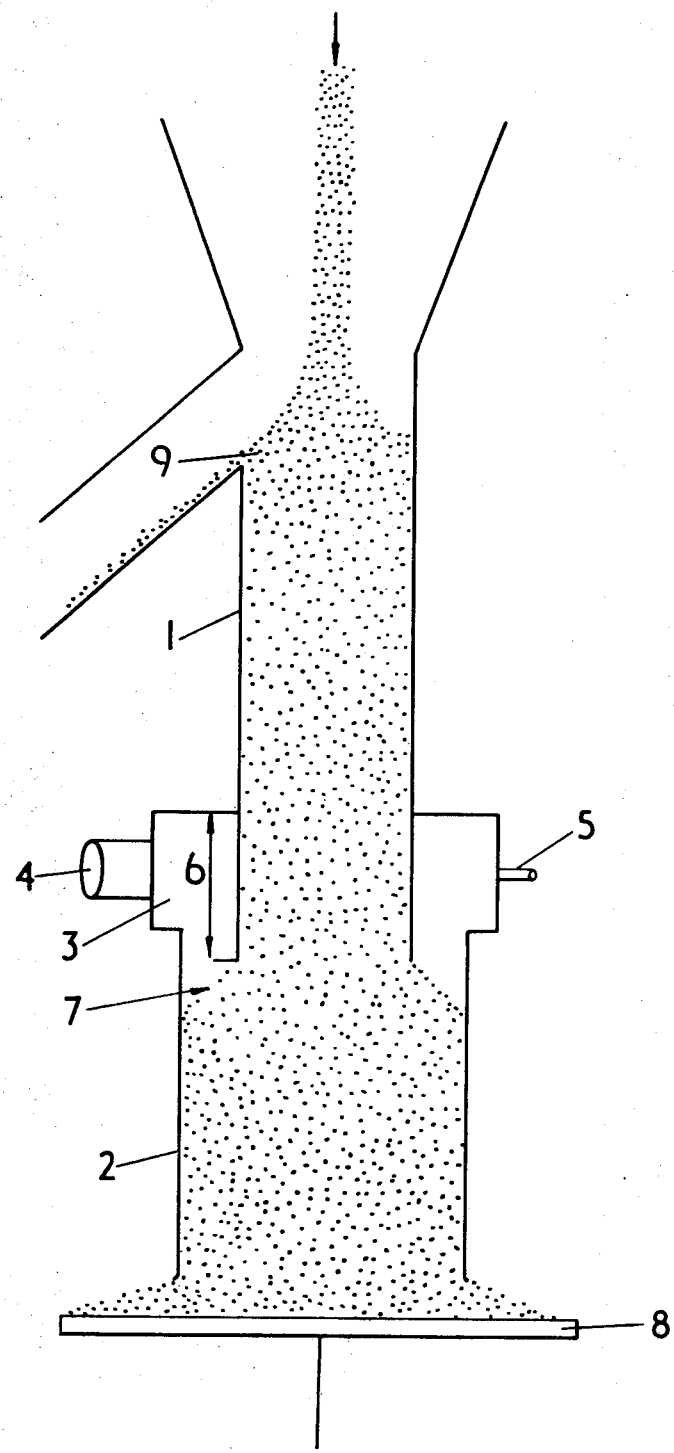
INVENTOR
BY HENRY GILBERT
MEUNIER
Holman, Glascock, Downing & Seebold
ATTORNEYS

United States Patent Office 3,608,357
Patented Sept. 28, 1971

3,608,357
MEASURING THE PERMEABILITY OF GRANULAR MATERIAL
Henry Gilbert Meunier, Liege, Belgium, assignor to Centre National de Recherches Metallurgiques, Brussels, Belgium
Filed Mar. 23, 1970, Ser. No. 21,818
Claims priority, application Belgium, Mar. 27, 1969, 730,607
Int. Cl. G01n 15/08
U.S. Cl. 73—38
8 Claims

ABSTRACT OF THE DISCLOSURE

In measuring permeability of a granular material a first substantially vertical conduit discharges into a second substantially vertical conduit of greater cross-section. An overflow outlet maintains a constant head in the first conduit and the rate of flow of granular material from the second conduit is controlled. The first and second conduits are connected fluid-tightly by a chamber into which a fluid, such as air, is blown.

---

The invention concerns apparatus for measuring the permeability of granular material, and is particularly applicable to an agglomeration mixture and specifically an agglomeration mixture of iron ore.

It has been suggested to estimate the permeability of beds of granular material by measuring one of the characteristics of blowing a fluid, such as air, through the material under predetermined operating conditions. The blowing of the fluid can be carried out at a constant rate and the pressure may be measured, which is then representative of the permeability. It is also possible to blow at constant pressure and to measure the rate of flow, which is in this case a representative indication of the permeability.

The apparatus generally proposed for carrying out such permeability measurement usually comprises an elongated conduit, the longitudinal axis of which is substantially vertical. The granular materials fall through the apparatus under the action of gravity, the process preferably being continuous. For this purpose use can be made of the feed hoppers of the agglomeration installation, or an auxiliary hopper may be used, to which a representative sample of the granular materials is deflected. The blowing of the fluids through these materials is generally carried out either by means of a tube introduced into the conduit parallel to its longitudinal axis or by means of one or more orifices in the lateral wall of the conduit.

The results obtained in this manner have been found to be very satisfactory, but it has been found that, according to the nature of the mixture of granular material, some apparatuses would give better results than others. This may be explained as follows: on the one hand, the accuracy of the permeability measurement is the better the more regular the flow of the granular material in the device is, and the larger the distribution surface of the blowing fluid through the granular material; on the other hand, according to the nature of the mixture of granular material examined, either these conditions of flow of materials and of distribution of blown-in fluid are more or less satisfied by the apparatus, or one condition may be satisfied to the detriment of the other.

By way of example, one can point out that apparatus in which blowing takes place through orifices made in its lateral wall is better for materials which have a tendency to stick, whereas a tube arranged in the interior of the conduit and parallel to its longitudinal axis is better suited to materials which do not have this tendency to stick.

The invention provides apparatus for measuring the permeability of granular material, comprising a first substantially vertical conduit for granular material discharging into a second substantially vertical conduit of greater cross-section, means for maintaining a substantially constant head of granular material in the first conduit, means for regulating the flow of granular material from the second conduit, a chamber connecting the first conduit and second conduit in a fluid-tight manner, and means for blowing a fluid into the chamber at a measured pressure and flow rate, whereby the fluid passes through the granular material in the second conduit.

The invention will be described further with reference to an exemplary embodiment shown schematically in vertical section in the accompanying drawing.

The apparatus illustrated has two vertical conduits 1, 2 which are superimposed. Granular material is fed to the upper conduit 1 and flows from there into the lower conduit 2; the cross-sectional area of the upper conduit 1 is smaller than that of the lower conduit 2. The outlet at the bottom of the conduit 2 is obturated by a plate 8 acting as a regulator of the rate of flow in such a manner that the passage of the material through the device takes place at a constant rate; this allows the material issuing from the conduit 1 to fall along the naturally sloping surface 7 of the material in the conduit 2. The conduit 1 has, at its upper end, a level regulator in the form of an overflow pipe 9 to ensure a constant level of material in the conduit 1. The height of the column of the material in the conduit 1 is sufficient to render negligible the slight variations in level at the level regulator. The conduit 2 has, at its upper end, a blowing chamber 3 connected to the conduit 1 in an air-tight manner. A suitable fluid, such as air, is blown into the chamber 3 through an inlet 4 at a substantially constant pressure and passes through the material in the conduit 2. A pressure point is provided at 5. The rate of flow of fluid is metered and provides a measurement of the permeability of the material.

The conduit 1 penetrates into the blowing chamber 3 and into the conduit 2 over a total length 6 equal to at least the height of the blowing chamber, to prevent the granular material issuing from the conduit 1 from accumlating in the chamber and disturbing blowing operation.

The superimposed conduits 1 and 2 advantageously have the same vertical axis. The cross-section of each of these two conduits 1 and 2 is advantageously constant over their height and preferably circular in shape.

In order to enable visual examination of the flow of the materials in the apparatus for the measurement of permeability, the conduit 2 is advantageously constituted of a transparent material, such as for instance Plexiglas, resistant to corrosion and friction. In this case obviously the conduit 2 should be reinforced by suitable external reinforcing.

The dimensions of the apparatus and in particular the cross-sections of the conduits 1 and 2, as well as their height, are adapted to the production of the agglomeration installation. By way of example, it can be mentioned that these dimensions are advantageously such that the passage time of the granular material through this apparatus is less than 30 seconds.

It should be noted that the blowing of the air through the granular materials is generally carried out at low pressure of the order to 30 mm. water gauge.

The advantages provided by the apparatus described above are as follows:

(a) Measurements of permeability of beds of granular materials may be carried out with any type of granular material, whether adherent or not.

(b) The flow of the granular materials through the apparatus is very regular.

(c) The measurement has great stability and is highly representative, since a large surface of granular materials is passed through by the fluid blown in.

(d) The apparatus is of simple, strong, and inexpensive construction.

By way of example and not restrictively, there is described below one application of the apparatus illustrated.

In an agglomeration installation for iron ore, with a capacity of 5,000 metric tons per day of agglomerates utilisable in a blast furnace, a granular mixture composed of 29% poor minerals, 34% hematite, 20% magnetite, and 17% of various additions, was treated.

The dimensions of the apparatus used for carrying out the measurement of the permeability of this mixture were:

Upper conduit 1

Constant circular section:

| | Mm. |
|---|---|
| Diameter | 200 |
| Length | 500 |

Lower conduit 2

Constant circular section:

| | |
|---|---|
| Diameter | 300 |
| Length | 500 |

The flow of the materials through the apparatus was at the rate of 4 to 5 metric tons per hour according to the course of the agglomeration belt. Air was blown in through these materials at constant pressure of the order of 30 mm. water gauge (regulated with an approximate error of 1 mm.), the average rate of flow being approximately 15 m.$^3$/hour at N.T.P. The rate of flow of air was measured and used as a measurement of the permeability of the granular mixture.

It was found that the passage time of the material through the apparatus was approximately 50 seconds. Thus, for this apparatus, there was a total response time of approximately 3 minutes between a variation of the addition of water to the mixture and the appearance of the corresponding variation in the measurement of the permeability.

As concerns the sensitivity of the measurement, it was verified that a variation of 0.2% humidity in the mixture brought about a variation of 1 m.$^3$/hour at N.T.P. in the measured flow rate.

I claim:

1. Apparatus for measuring the permeability of granular material, comprising a first substantially vertical conduit for granular material;

means for maintaining a substantially constant head of granular material in the first conduit;

a second substantially vertical conduit for granular material, the first conduit discharging into the second conduit, and the second conduit being of greater cross-section than the first conduit;

means for regulating the flow of granular material from the second conduit;

a chamber connecting the first conduit and second conduit in a fluid-tight manner; and means for blowing a fluid into the chamber at a measured pressure and flow rate, whereby the fluid passes through the granular material in the second conduit and the permeability of the granular material may be determined.

2. Apparatus as claimed in claim 1, in which the first conduit extends through the chamber to a total length at least equal to the height of the chamber.

3. Apparatus as claimed in claim 1, in which the first and second conduits have substantially the same longitudinal axis.

4. Apparatus as claimed in claim 1, in which the means for maintaining a substantially constant head comprises an overflow outlet in the first conduit.

5. Apparatus as claimed in claim 1, in which the chamber has a fluid inlet and a pressure point.

6. Apparatus as claimed in claim 1, in which the cross-section of each conduit is constant over the major part of its height.

7. Apparatus as claimed in claim 6, in which the cross-section of each conduit is circular.

8. Apparatus as claimed in claim 1, in which at least part of the second conduit is of transparent material resistant to corrosion and friction, whereby visual examination of the flow of material in the second conduit is possible.

References Cited

UNITED STATES PATENTS

| 3,505,856 | 4/1970 | Meunier | 73—38 |

FOREIGN PATENTS

| 673,409 | 7/1966 | Belgium | 73—38 |
| 1,385,919 | 12/1964 | France | 73—38 |

LOUIS R. PRINCE, Primary Examiner

W. A. HENRY II, Assistant Examiner